US012582158B2

(12) United States Patent
Dittmann et al.

(10) Patent No.: US 12,582,158 B2
(45) Date of Patent: Mar. 24, 2026

(54) CONVERGENT AEROSOL-GENERATOR

(71) Applicant: Philip Morris Products S.A., Neuchatel (CH)

(72) Inventors: Leander Dittmann, Neuchatel (CH); Robert Emmett, Neuchatel (CH)

(73) Assignee: Philip Morris Products S.A., Neuchatel (CH)

(*) Notice: Subject to any disclaimer, the term of this patent is extended or adjusted under 35 U.S.C. 154(b) by 459 days.

(21) Appl. No.: 17/787,860

(22) PCT Filed: Dec. 22, 2020

(86) PCT No.: PCT/EP2020/087670

§ 371 (c)(1), (2) Date: Jun. 21, 2022

(87) PCT Pub. No.: WO2021/130248

PCT Pub. Date: Jul. 1, 2021

(65) Prior Publication Data

US 2023/0033145 A1 Feb. 2, 2023

(30) Foreign Application Priority Data

Dec. 23, 2019 (EP) .................................... 19219369

(51) Int. Cl.
*A24F 40/05* (2020.01)
*A24F 40/10* (2020.01)
(Continued)

(52) U.S. Cl.
CPC .............. *A24F 40/05* (2020.01); *A24F 40/10* (2020.01); *A24F 40/48* (2020.01); *A24F 40/50* (2020.01); *B05B 17/063* (2013.01)

(58) Field of Classification Search
CPC ......... A24F 40/05; A24F 40/10; B05B 17/063
See application file for complete search history.

(56) References Cited

U.S. PATENT DOCUMENTS 3,938,062 A 2/1976 Hopp
4,453,242 A * 6/1984 Toda ........................ G11B 3/00 369/132
(Continued)

FOREIGN PATENT DOCUMENTS

CN 102458684 A 5/2012
CN 108697178 A 10/2018
(Continued)

OTHER PUBLICATIONS

Russian Search Report mailed Mar. 29, 2024 in corresponding Russian Patent Application No. 2022119797/03, 2 pages.
(Continued)

*Primary Examiner* — Michael H. Wilson
*Assistant Examiner* — Ronnie Kirby Jordan
(74) *Attorney, Agent, or Firm* — Oblon, McClelland, Maier & Neustadt, L.L.P.

(57) ABSTRACT

An aerosol-generator for an aerosol-generating device is provided, including: a surface acoustic wave atomiser including: a substrate including an active surface defining an atomisation region, and at least one transducer positioned on the active surface to generate surface acoustic waves for defining an acoustic wavefront on the active surface; and a supply element arranged to supply a liquid aerosol-forming substrate to the atomisation region so that liquid aerosol-forming substrate in the atomisation region defines an interface between the active surface, the liquid aerosol-forming substrate, and the atmosphere, in which the at least one transducer and the supply element are configured so that a shape of the acoustic wavefront at the interface corresponds to a shape of at least part of the interface. An aerosol-generating device including the aerosol-generator is also provided.

17 Claims, 4 Drawing Sheets

(51) Int. Cl.
*A24F 40/48* (2020.01)
*A24F 40/50* (2020.01)
*B05B 17/06* (2006.01)

(56) References Cited

U.S. PATENT DOCUMENTS

| | | | | |
|---|---|---|---|---|
| 4,948,407 | A * | 8/1990 | Bindell et al. | G02B 6/1345 65/386 |
| 2012/0187209 | A1* | 7/2012 | Friend et al. | B05B 17/04 239/4 |
| 2013/0306084 | A1 | 11/2013 | Flick | |
| 2014/0292155 | A1* | 10/2014 | Ballandras et al. | H03H 9/178 310/348 |
| 2014/0300695 | A1 | 10/2014 | Smalley et al. | |
| 2014/0338685 | A1 | 11/2014 | Amir | |
| 2015/0245654 | A1 | 9/2015 | Memari et al. | |
| 2015/0245655 | A1 | 9/2015 | Memari et al. | |
| 2015/0245656 | A1 | 9/2015 | Memari et al. | |
| 2015/0245657 | A1 | 9/2015 | Memari et al. | |
| 2015/0245662 | A1 | 9/2015 | Memari et al. | |
| 2015/0245663 | A1 | 9/2015 | Memari et al. | |
| 2015/0245664 | A1 | 9/2015 | Memari et al. | |
| 2015/0245665 | A1 | 9/2015 | Memari et al. | |
| 2015/0245666 | A1 | 9/2015 | Memari et al. | |
| 2015/0245667 | A1 | 9/2015 | Memari et al. | |
| 2015/0245668 | A1 | 9/2015 | Memari et al. | |
| 2015/0359266 | A1 | 12/2015 | Memari et al. | |
| 2016/0150824 | A1 | 6/2016 | Memari et al. | |
| 2016/0192712 | A1 | 7/2016 | Memari et al. | |
| 2016/0192713 | A1 | 7/2016 | Memari et al. | |
| 2017/0280771 | A1* | 10/2017 | Courbat et al. | A24F 40/05 |
| 2017/0360105 | A1 | 12/2017 | Memari et al. | |
| 2017/0360106 | A1 | 12/2017 | Memari et al. | |
| 2017/0360107 | A1 | 12/2017 | Memari et al. | |
| 2017/0360108 | A1 | 12/2017 | Memari et al. | |
| 2017/0360109 | A1 | 12/2017 | Memari et al. | |
| 2017/0360110 | A1 | 12/2017 | Memari et al. | |
| 2017/0360111 | A1 | 12/2017 | Memari et al. | |
| 2017/0360112 | A1 | 12/2017 | Memari et al. | |
| 2017/0360113 | A1 | 12/2017 | Memari et al. | |
| 2017/0360114 | A1 | 12/2017 | Memari et al. | |
| 2017/0360115 | A1 | 12/2017 | Memari et al. | |
| 2017/0360116 | A1 | 12/2017 | Memari et al. | |
| 2018/0000162 | A1 | 1/2018 | Memari et al. | |
| 2018/0000163 | A1 | 1/2018 | Memari et al. | |
| 2018/0049474 | A1 | 2/2018 | Memari et al. | |
| 2018/0049475 | A1 | 2/2018 | Memari et al. | |
| 2018/0271158 | A1 | 9/2018 | Memari et al. | |
| 2018/0271159 | A1 | 9/2018 | Memari et al. | |
| 2018/0271160 | A1 | 9/2018 | Memari et al. | |
| 2018/0271161 | A1 | 9/2018 | Memari et al. | |
| 2018/0271162 | A1 | 9/2018 | Memari et al. | |
| 2018/0271163 | A1 | 9/2018 | Memari et al. | |
| 2018/0271164 | A1 | 9/2018 | Memari et al. | |
| 2018/0271165 | A1 | 9/2018 | Memari et al. | |
| 2018/0271166 | A1 | 9/2018 | Memari et al. | |
| 2018/0271167 | A1 | 9/2018 | Memari et al. | |
| 2018/0335280 | A1 | 11/2018 | Flick | |
| 2019/0069603 | A1 | 3/2019 | Memari et al. | |
| 2020/0008483 | A1 | 1/2020 | Memari et al. | |
| 2020/0008484 | A1 | 1/2020 | Memari et al. | |
| 2020/0008485 | A1 | 1/2020 | Memari et al. | |
| 2020/0008486 | A1 | 1/2020 | Memari et al. | |
| 2020/0008487 | A1 | 1/2020 | Memari et al. | |
| 2020/0008488 | A1 | 1/2020 | Memari et al. | |
| 2020/0008489 | A1 | 1/2020 | Memari et al. | |
| 2020/0008490 | A1 | 1/2020 | Memari et al. | |
| 2020/0008491 | A1 | 1/2020 | Memari et al. | |
| 2020/0008492 | A1 | 1/2020 | Memari et al. | |
| 2020/0022420 | A1 | 1/2020 | Memari et al. | |
| 2020/0214352 | A1 | 7/2020 | Memari et al. | |
| 2020/0232766 | A1 | 7/2020 | Flick | |
| 2021/0021255 | A1* | 1/2021 | Ballandras et al. | H03H 9/25 |
| 2021/0045449 | A1 | 2/2021 | Memari et al. | |
| 2022/0022551 | A1* | 1/2022 | Inagaki et al. | A24F 40/57 |

FOREIGN PATENT DOCUMENTS

| | | | |
|---|---|---|---|
| EA | 009116 | B1 | 10/2007 |
| EP | 2 870 888 | A1 | 5/2015 |
| JP | 62-9449 | U | 1/1987 |
| JP | 11-207224 | | 8/1999 |
| JP | 2004-294567 | A | 10/2004 |
| JP | 2008-238058 | A | 10/2008 |
| JP | 2014-532359 | A | 12/2014 |
| KR | 10-2018-0121777 | A | 11/2018 |
| KZ | 31889 | B | 3/2017 |
| RU | 20 457 | U1 | 11/2001 |
| RU | 107 026 | U1 | 8/2011 |
| RU | 2 703 127 | C2 | 10/2019 |
| WO | WO 2017/167521 | A1 | 10/2017 |

OTHER PUBLICATIONS

International Search Report issued Mar. 29, 2021 in PCT/EP2020/087670 filed on Dec. 22, 2020, 5 pages.
Written Opinion issued Mar. 29, 2021 in PCT/EP2020/087670 filed on Dec. 22, 2020, 6 pages.
Japanese Office Action issued Oct. 21, 2024 in Japanese Patent Application No. 2022-538438 (with English Translation), 7 pages.
Office action and Search Report issued Apr. 12, 2025, in corresponding Chinese Patent Application No. 202080089320.2 (with English translation).
Korean Office Action issued Aug. 19, 2025 in Korean Patent Application No. 10-2022-7024518 (with English Translation), 8 pages.
Office Action dated Jan. 26, 2026, in the corresponding Japanese Patent Application No. 2022-538438 (with English translation) (citing documents 1-3).

* cited by examiner

CONVERGENT AEROSOL-GENERATOR

The present disclosure relates to an aerosol-generator for an aerosol-generating device, the aerosol-generator comprising a surface acoustic wave atomiser and a supply element configured to generate a shaped acoustic wavefront. The present disclosure also relates to an aerosol-generator for an aerosol-generating device, the aerosol-generator comprising first and second transducers driven by different drive signals.

Aerosol-generating systems in which an aerosol-forming substrate is heated rather than combusted are known in the art. Typically in such aerosol-generating systems, an aerosol is generated by the transfer of energy from an aerosol-generator of an aerosol-generating device to an aerosol-forming substrate. For example, known aerosol-generating devices comprise a heater arranged to heat and vaporise a liquid aerosol-forming substrate.

An alternative to vaporising a liquid aerosol-forming substrate by electrical heating is atomisation using surface acoustic waves. However, non-uniformity in piezoelectric materials used to generate surface acoustic waves may reduce or prevent the efficient transfer of energy from surface acoustic waves to a liquid aerosol-forming substrate.

It would be desirable to provide an aerosol-generator for an aerosol-generating device that facilitates the efficient atomisation of liquid aerosol-forming substrates using surface acoustic waves.

According to a first aspect of the present disclosure there is provided an aerosol-generator for an aerosol-generating device, the aerosol-generator comprising a surface acoustic wave atomiser and a supply element. The surface acoustic wave atomiser comprises a substrate comprising an active surface defining an atomisation region, and at least one transducer positioned on the active surface of the substrate for generating surface acoustic waves for defining an acoustic wavefront on the active surface of the substrate. The supply element is arranged to supply a liquid aerosol-forming substrate to the atomisation region so that liquid aerosol-forming substrate in the atomisation region defines an interface between the active surface, the liquid aerosol-forming substrate and the atmosphere. The at least one transducer and the supply element are configured so that a shape of the acoustic wavefront at the interface corresponds to a shape of at least part of the interface.

The term "surface acoustic wave" is used herein to include Rayleigh waves, Lamb waves and Love waves.

Advantageously, aerosol-generators according to the first aspect of the present disclosure provide an acoustic wavefront that has a shape corresponding to a shape of at least part of an interface between a liquid aerosol-forming substrate, an active surface of a surface acoustic wave atomiser substrate, and the atmosphere. Advantageously, matching the shape of the acoustic wavefront to a shape of at least part of the interface may improve or increase the transfer of energy from the surface acoustic waves to the liquid aerosol-forming substrate.

Preferably, the at least one transducer comprises an interdigital transducer comprising an array of interleaved electrodes.

The spacing between consecutive interleaved electrodes of the transducer may vary with direction across the active surface of the substrate. The present inventors have recognised that anisotropy in the surface acoustic wave velocity across the active surface of the substrate may result in an acoustic wavefront having a shape that is different to the shape of the transducer. Advantageously, varying the spacing between consecutive interleaved electrodes of the transducer with direction across the active surface of the substrate may produce an acoustic wavefront having a desired shape.

The array of interleaved electrodes may have a symmetrical shape comprising a first line of symmetry extending in a first direction and a second line of symmetry extending in a second direction. The first direction may be orthogonal to the second direction.

Each of the interleaved electrodes may have an elliptical shape. Preferably, the interleaved electrodes are arranged concentrically on the active surface of the substrate. Preferably, the atomisation region is positioned at the centre of the array of concentric interleaved electrodes.

Preferably, the interdigital transducer defines a first direction extending along the major axes of the concentric interleaved electrodes and a second direction extending along the minor axes of the concentric interleaved electrodes, wherein the spacing between consecutive interleaved electrodes is greater in the first direction than the second direction. Advantageously, the larger spacing between the consecutive interleaved electrodes in the first direction may facilitate the generation of a substantially circular acoustic wavefront by the interdigital transducer.

The substrate may comprise a crystalline material. Preferably, the active surface of the substrate is defined by a lattice plane of the crystalline material. Preferably, each of the first direction and the second direction is aligned with a lattice vector of the lattice plane. Advantageously, aligning the first and second directions of the interdigital transducer with lattice vectors of the lattice plane may further facilitate the generation of a substantially circular acoustic wavefront by the interdigital transducer.

Preferably, the supply element comprises an opening in the active surface of the substrate. Preferably, the opening is positioned within the atomisation region. Preferably, the opening has a substantially circular shape.

The at least one transducer may comprise a first interdigital transducer and a second interdigital transducer. Preferably, the first interdigital transducer comprises a first array of interleaved electrodes. Preferably, the second interdigital transducer comprises a second array of interleaved electrodes. Preferably, a spacing between consecutive electrodes of the first array of interleaved electrodes is different to a spacing between consecutive electrodes of the second array of interleaved electrodes.

During use, the first interdigital transducer may generate first acoustic waves and the second interdigital transducer may generate second acoustic waves, wherein the first and second acoustic waves define a combined acoustic wavefront. The present inventors have recognised that anisotropy in the surface acoustic wave velocity across the active surface of the substrate may result in an acoustic wavefront having a shape that is different to a shape of a transducer arranged on the active surface of the substrate. Advantageously, providing a first interdigital transducer having a first electrode spacing and a second interdigital transducer having a second electrode spacing that is different to the first electrode spacing may produce a combined acoustic wavefront having a desired shape.

Preferably, the first interdigital transducer is configured for generating surface acoustic waves in a first direction along the active surface towards the atomisation region. Preferably, the second interdigital transducer is configured for generating surface acoustic waves in a second direction along the active surface towards the atomisation region. Preferably, the first direction is different to the second direction.

The first interdigital transducer and the second interdigital transducer may each be configured for generating plane surface acoustic waves.

Preferably, the first direction is orthogonal to the second direction.

The substrate may comprise a crystalline material. Preferably, the active surface of the substrate is defined by a lattice plane of the crystalline material. Preferably, each of the first direction and the second direction is aligned with a lattice vector of the lattice plane. Advantageously, aligning the first and second directions defined by the first and second interdigital transducers with lattice vectors of the lattice plane may facilitate the generation of a combined acoustic wavefront having a desired shape. The desired shape may be a symmetrical shape.

Preferably, the supply element comprises an opening in the active surface of the substrate. Preferably, the opening is positioned within the atomisation region. The opening may have a substantially rectangular shape. The opening may have a substantially square shape.

Preferably, the at least one transducer comprises an interdigital transducer comprising an array of interleaved electrodes.

Each of the interleaved electrodes may have a circular shape. Preferably, the interleaved electrodes are arranged concentrically on the active surface of the substrate. Preferably, the atomisation region is positioned at the centre of the array of concentric interleaved electrodes. Preferably, the supply element comprises an opening in the active surface of the substrate. Preferably, the opening is positioned within the atomisation region. Preferably, the opening has an elliptical shape.

The present inventors have recognised that anisotropy in the surface acoustic wave velocity across the active surface of the substrate may result in an acoustic wavefront having a shape that is different to the shape of the transducer. In particular, for an interdigital transducer comprising an array of concentrically arranged circular interleaved electrodes, the acoustic wavefront may have a non-circular shape. For example, the acoustic wavefront may have an elliptical shape. Advantageously, the elliptical shape of the opening may correspond substantially to the shape of the acoustic wavefront generated by the interdigital transducer.

Preferably, the elliptical opening defines a first direction extending along the major axis of the opening and a second direction extending along the minor axis of the opening.

The substrate may comprise a crystalline material. Preferably, the active surface of the substrate is defined by a lattice plane of the crystalline material. Preferably, each of the first direction and the second direction is aligned with a lattice vector of the lattice plane. Advantageously, aligning the first and second directions of the elliptical opening with lattice vectors of the lattice plane may facilitate matching of the shape of the elliptical opening to the shape of the acoustic wavefront generated by the interdigital transducer.

The aerosol-generator may comprise a controller. Preferably, the controller is configured to provide a drive signal to the at least one transducer for generating surface acoustic waves on the active surface of the substrate.

The supply element may comprise a channel extending through the substrate between an inlet and an outlet. Preferably, the inlet is positioned on a passive surface of the substrate. Preferably, the outlet is positioned on the active surface of the substrate. Preferably, the outlet is positioned within the atomisation region. In embodiments in which the supply element comprises an opening in the active surface of the substrate, preferably the outlet is the opening.

The supply element may comprise a flow control element arranged to control a flow of a liquid aerosol-forming substrate to the atomisation region. In embodiments in which the supply element comprises a channel, preferably the flow control element is arranged to control a flow of the liquid aerosol-forming substrate into the channel.

The flow control element may comprise at least one passive element. The at least one passive element may comprise at least one of a capillary tube and a capillary wick.

The flow control element may comprise at least one active element. The at least one active element may comprise at least one of a micro pump, a syringe pump, a piston pump, and an electroosmotic pump.

In embodiments in which the aerosol-generator comprises a controller, preferably, the controller is configured to provide a flow signal to the flow control element to enable a flow of the liquid aerosol-forming substrate to the atomisation region. Preferably, the controller is configured to provide a stop signal to the control element to disable the flow of the liquid aerosol-forming substrate. Preferably, the controller is configured to provide the drive signal to the at least on transducer only when the controller provides the flow signal to the flow control element.

The surface acoustic wave atomiser may comprise at least one reflector. Preferably, the at least one reflector is positioned on the active surface of the substrate. Preferably, the at least one reflector is arranged to reflect surface acoustic waves generated by the at least one transducer. Preferably, the at least one reflector is arranged to reflect surface acoustic waves generated by the at least one transducer towards the atomisation region. Advantageously, a reflector arranged to reflect surface acoustic waves towards the atomisation region may increase or maximise the efficiency of the surface acoustic wave atomiser.

The at least one reflector may comprise one or more electrodes.

The at least one reflector may comprise one or more portions of metal positioned on the active surface of the substrate. Each portion of metal may have a linear shape. Each portion of metal may have a curved shape. The at least one reflector may comprise a plurality of portions of metal. The plurality of portions of metal may be arranged in a pattern on the active surface of the substrate. Preferably, each portion of metal is substantially parallel to the adjacent portions of metal forming the at least one reflector.

A portion of the substrate may form at least part of the at least one reflector. The substrate may define at least one protrusion, wherein the at least one protrusion forms at least part of the at least one reflector. The substrate may define at least one recess, wherein the at least one recess forms at least part of the at least one reflector.

The surface acoustic wave atomiser may comprise at least one absorber. Preferably, the at least one absorber is positioned on the active surface of the substrate. Preferably, the at least one absorber is arranged to absorb surface acoustic waves generated by the at least one transducer.

The at least one absorber may comprise a material having at least one of a low density, a low speed of sound and a high viscosity. The at least one absorber may comprise polydimethylsiloxane.

A portion of the substrate may form at least part of the at least one absorber. The substrate may define at least one protrusion, wherein the at least one protrusion forms at least part of the at least one absorber. The substrate may define at least one recess, wherein the at least one recess forms at least part of the at least one absorber.

The substrate is formed from a substrate material. The substrate may be a piezoelectric material. The substrate material may comprise a monocrystalline material. The substrate material may comprise a polycrystalline material. The substrate material may comprise at least one of quartz, a ceramic, barium titanate ($BaTiO_3$), and lithium niobate ($LiNbO_3$). The ceramic may comprise lead zirconate titanate (PZT). The ceramic may include doping materials such as Ni, Bi, La, Nd or Nb ions. The substrate material may be polarised. The substrate material may be unpolarised. The substrate material may comprise both polarised and unpolarised materials.

The substrate may comprise a surface treatment. The surface treatment may be applied to the active surface of the substrate. The surface treatment may comprise a coating. The coating may comprise a hydrophobic material. The coating may comprise a hydrophilic material. The coating may comprise an oleophobic material. The coating may comprise an oleophilic material.

According to a second aspect of the present disclosure there is provided an aerosol-generator for an aerosol-generating device, the aerosol-generator comprising a surface acoustic wave atomiser and a supply element. The surface acoustic wave atomiser comprises a substrate comprising an active surface defining an atomisation region, and at least one transducer positioned on the active surface of the substrate for generating surface acoustic waves for defining an acoustic wavefront on the active surface of the substrate. The supply element is arranged to supply a liquid aerosol-forming substrate to the atomisation region so that liquid aerosol-forming substrate in the atomisation region defines an interface between the active surface, the liquid aerosol-forming substrate and the atmosphere. The at least one transducer comprises an interdigital transducer comprising an array of interleaved electrodes, wherein the spacing between consecutive interleaved electrodes varies with direction across the active surface.

The aerosol-generator according to the second aspect of the present disclosure may comprise any of the optional or preferred features described with respect to the first aspect of the present disclosure.

According to a third aspect of the present disclosure there is provided an aerosol-generator for an aerosol-generating device, the aerosol-generator comprising a surface acoustic wave atomiser and a supply element. The surface acoustic wave atomiser comprises a substrate comprising an active surface defining an atomisation region, and at least one transducer positioned on the active surface of the substrate for generating surface acoustic waves for defining an acoustic wavefront on the active surface of the substrate. The supply element is arranged to supply a liquid aerosol-forming substrate to the atomisation region so that liquid aerosol-forming substrate in the atomisation region defines an interface between the active surface, the liquid aerosol-forming substrate and the atmosphere. The at least one transducer comprises a first interdigital transducer comprising a first array of interleaved electrodes and a second interdigital transducer comprising a second array of interleaved electrodes. A spacing between consecutive electrodes of the first array of interleaved electrodes is different to a spacing between consecutive electrodes of the second array of interleaved electrodes.

The aerosol-generator according to the third aspect of the present disclosure may comprise any of the optional or preferred features described with respect to the first aspect of the present disclosure.

According to a fourth aspect of the present disclosure there is provided an aerosol-generator for an aerosol-generating device, the aerosol-generator comprising a surface acoustic wave atomiser and a supply element. The surface acoustic wave atomiser comprises a substrate comprising an active surface defining an atomisation region, and at least one transducer positioned on the active surface of the substrate for generating surface acoustic waves for defining an acoustic wavefront on the active surface of the substrate. The supply element is arranged to supply a liquid aerosol-forming substrate to the atomisation region so that liquid aerosol-forming substrate in the atomisation region defines an interface between the active surface, the liquid aerosol-forming substrate and the atmosphere. The at least one transducer comprises an interdigital transducer comprising an array of interleaved electrodes, wherein each of the interleaved electrodes has a circular shape, and wherein the interleaved electrodes are arranged concentrically on the active surface. The atomisation region is positioned at the centre of the array of concentric interleaved electrodes. The supply element comprises an opening in the active surface of the substrate and positioned within the atomisation region, wherein the opening has an elliptical shape.

The aerosol-generator according to the fourth aspect of the present disclosure may comprise any of the optional or preferred features described with respect to the first aspect of the present disclosure.

According to a fifth aspect of the present disclosure there is provided an aerosol-generator for an aerosol-generating device, the aerosol-generator comprising a surface acoustic wave atomiser, a supply element and a controller. The surface acoustic wave atomiser comprises a substrate comprising an active surface defining an atomisation region, a first transducer and a second transducer. The first transducer is positioned on the active surface of the substrate for generating surface acoustic waves in a first direction along the active surface towards the atomisation region. The second transducer is positioned on the active surface of the substrate for generating surface acoustic waves in a second direction along the active surface towards the atomisation region, wherein the first direction is different to the second direction. The supply element is arranged to supply a liquid aerosol-forming substrate to the atomisation region. The controller is configured to provide a first drive signal to the first transducer and a second drive signal to the second transducer, wherein the first drive signal is different to the second drive signal.

The present inventors have recognised that anisotropy in the electromechanical coupling coefficient across the active surface of the substrate can result in surface acoustic waves travelling in different directions across the active surface having different amplitudes. Advantageously, aerosol-generators according to the fifth aspect of the present disclosure comprise a controller configured to drive first and second transducers to generate surface acoustic waves in different first and second directions across the active surface of the substrate, wherein the first and second transducers are driven by different drive signals. Advantageously, the different drive signals may compensate for anisotropy in the electromechanical coupling coefficient between the first and second directions. Advantageously, using different drive signals to compensate for anisotropy in the electromechanical coupling coefficient may result in surface acoustic waves in the first and second directions having substantially the same amplitude. Advantageously, surface acoustic waves having the same amplitude in the first direction and the second direction may improve or optimise the aerosolisation of a liquid aerosol-forming substrate at the atomisation region.

Preferably, the power of the first drive signal is different to a power of the second drive signal.

The substrate may have a first electromechanical coupling coefficient in the first direction and a second electromechanical coupling coefficient in the second direction, wherein the first electromechanical coupling coefficient is larger than the second electromechanical coupling coefficient. Preferably, the power of the first drive signal is smaller than the power of the second drive signal. Preferably, a ratio of the first electromechanical coupling coefficient to the second electromechanical coupling coefficient is the same as a ratio of the power of the second drive signal to the power of the first drive signal.

The first direction may be orthogonal to the second direction.

The substrate may comprise a crystalline material. Preferably, the active surface of the substrate is defined by a lattice plane of the crystalline material. Preferably, each of the first direction and the second direction is aligned with a lattice vector of the lattice plane. Advantageously, aligning the first and second directions with lattice vectors of the lattice plane may provide a substantially constant first electromechanical coupling coefficient in the first direction and a substantially constant second electromechanical coupling coefficient in the second direction.

Each of the first transducer and the second transducer may comprise an interdigital transducer comprising a plurality of electrodes. Preferably, the plurality of electrodes are substantially parallel with each other. Preferably, the interdigital transducer comprises a first array of electrodes and a second array of electrodes interleaved with the first array of electrodes. Preferably, the first array of electrodes is substantially parallel with the second array of electrodes.

Each of the first transducer and the second transducer may be configured to generate surface acoustic waves having a substantially linear wavefront. In embodiments in which the transducer is an interdigital transducer comprising a plurality of electrodes, each electrode may be substantially linear.

Each of the first transducer and the second transducer may be configured to generate surface acoustic waves having a curved wavefront. In embodiments in which the transducer is an interdigital transducer comprising a plurality of electrodes, each electrode may be curved. The transducer may be configured to generate surface acoustic waves having a convex wavefront. Preferably, the transducer may be configured to generate surface acoustic waves having a concave wavefront. Advantageously, a concave wavefront may provide a focussing effect. In other words, a concave wavefront may focus the generated surface acoustic waves towards an atomisation region that is smaller than the transducer. Advantageously, focussing the generated surface acoustic waves may increase the rate at which energy is delivered to a liquid aerosol-forming substrate in the atomisation region.

The supply element may comprise a channel extending through the substrate between an inlet and an outlet. Preferably, the inlet is positioned on a passive surface of the substrate. Preferably, the outlet is positioned on the active surface of the substrate. Preferably, the outlet is positioned within the atomisation region.

The supply element may comprise a flow control element arranged to control a flow of a liquid aerosol-forming substrate to the atomisation region. In embodiments in which the supply element comprises a channel, preferably the flow control element is arranged to control a flow of the liquid aerosol-forming substrate into the channel.

The flow control element may comprise at least one passive element. The at least one passive element may comprise at least one of a capillary tube and a capillary wick.

The flow control element may comprise at least one active element. The at least one active element may comprise at least one of a micro pump, a syringe pump, a piston pump, and an electroosmotic pump.

Preferably, the controller is configured to provide a flow signal to the flow control element to enable a flow of the liquid aerosol-forming substrate to the atomisation region. Preferably, the controller is configured to provide a stop signal to the control element to disable the flow of the liquid aerosol-forming substrate. Preferably, the controller is configured to provide the first and second drive signals to the first and second transducers only when the controller provides the flow signal to the flow control element.

The surface acoustic wave atomiser may comprise at least one reflector. Preferably, the at least one reflector is positioned on the active surface of the substrate. Preferably, the at least one reflector is arranged to reflect surface acoustic waves generated by at least one of the first and second transducers. Preferably, the at least one reflector is arranged to reflect surface acoustic waves generated by at least one of the first and second transducers towards the atomisation region. Advantageously, a reflector arranged to reflect surface acoustic waves towards the atomisation region may increase or maximise the efficiency of the surface acoustic wave atomiser.

The at least one reflector may comprise one or more electrodes.

The at least one reflector may comprise one or more portions of metal positioned on the active surface of the substrate. Each portion of metal may have a linear shape. Each portion of metal may have a curved shape. The at least one reflector may comprise a plurality of portions of metal. The plurality of portions of metal may be arranged in a pattern on the active surface of the substrate. Preferably, each portion of metal is substantially parallel to the adjacent portions of metal forming the at least one reflector.

A portion of the substrate may form at least part of the at least one reflector. The substrate may define at least one protrusion, wherein the at least one protrusion forms at least part of the at least one reflector. The substrate may define at least one recess, wherein the at least one recess forms at least part of the at least one reflector.

The surface acoustic wave atomiser may comprise at least one absorber. Preferably, the at least one absorber is positioned on the active surface of the substrate. Preferably, the at least one absorber is arranged to absorb surface acoustic waves generated by at least one of the first and second transducers.

The at least one absorber may comprise a material having at least one of a low density, a low speed of sound and a high viscosity. The at least one absorber may comprise polydimethylsiloxane.

A portion of the substrate may form at least part of the at least one absorber. The substrate may define at least one protrusion, wherein the at least one protrusion forms at least part of the at least one absorber. The substrate may define at least one recess, wherein the at least one recess forms at least part of the at least one absorber.

The substrate is formed from a substrate material. The substrate may be a piezoelectric material. The substrate material may comprise a monocrystalline material. The substrate material may comprise a polycrystalline material. The substrate material may comprise at least one of quartz, a ceramic, barium titanate ($BaTiO_3$), and lithium niobate ($LiNbO_3$). The ceramic may comprise lead zirconate titanate (PZT). The ceramic may include doping materials such as Ni, Bi, La, Nd or Nb ions. The substrate material may be polarised. The substrate material may be unpolarised. The substrate material may comprise both polarised and unpolarised materials.

The substrate may comprise a surface treatment. The surface treatment may be applied to the active surface of the substrate. The surface treatment may comprise a coating. The coating may comprise a hydrophobic material. The coating may comprise a hydrophilic material. The coating may comprise an oleophobic material. The coating may comprise an oleophilic material.

According to a sixth aspect of the present disclosure there is provided an aerosol-generator for an aerosol-generating device, the aerosol-generator comprising a surface acoustic wave atomiser and a supply element. The surface acoustic wave atomiser comprises a substrate comprising an active surface defining an atomisation region and a transducer positioned on the active surface of the substrate for generating surface acoustic waves on the active surface of the substrate. A portion of the active surface of the substrate underlying at least a portion of the transducer comprises a surface treatment. The supply element is arranged to supply a liquid aerosol-forming substrate to the atomisation region.

The present inventors have recognised that anisotropy in the electromechanical coupling coefficient across the active surface of the substrate can result in surface acoustic waves travelling in different directions across the active surface having different amplitudes. Advantageously, the surface treatment of the substrate of aerosol-generators according to the sixth aspect of the present disclosure may at least partially compensate for the anisotropy in the electromechanical coupling coefficient. In other words, the surface treatment of the substrate may simulate or provide a substantially isotropic electromechanical coupling coefficient across at least a portion of the active surface of the substrate.

The substrate is formed from a substrate material. The substrate may be a piezoelectric material. The substrate material may comprise a monocrystalline material. The substrate material may comprise a polycrystalline material. The substrate material may comprise at least one of quartz, a ceramic, barium titanate ($BaTiO_3$), and lithium niobate ($LiNbO_3$). The ceramic may comprise lead zirconate titanate (PZT). The ceramic may include doping materials such as Ni, Bi, La, Nd or Nb ions. The substrate material may be polarised. The substrate material may be unpolarised. The substrate material may comprise both polarised and unpolarised materials.

Preferably, the surface treatment comprises a proton exchange treatment. The substrate may comprise lithium niobate, wherein the proton exchange treatment comprises replacement of lithium ions with hydrogen ions in the portion of the active surface comprising the surface treatment.

The surface acoustic wave atomiser may comprise a coating on at least a portion of the active surface of the substrate. The coating may comprise a hydrophobic material. The coating may comprise a hydrophilic material. The coating may comprise an oleophobic material. The coating may comprise an oleophilic material.

The aerosol-generator may comprise a controller. Preferably, the controller is configured to provide a drive signal to the transducer for generating surface acoustic waves on the active surface of the substrate.

The transducer may comprise an interdigital transducer comprising a plurality of electrodes. Preferably, the plurality of electrodes are substantially parallel with each other. Preferably, the interdigital transducer comprises a first array of electrodes and a second array of electrodes interleaved with the first array of electrodes. Preferably, the first array of electrodes is substantially parallel with the second array of electrodes.

The transducer may be configured to generate surface acoustic waves having a substantially linear wavefront. In embodiments in which the transducer is an interdigital transducer comprising a plurality of electrodes, each electrode may be substantially linear.

The transducer may be configured to generate surface acoustic waves having a curved wavefront. In embodiments in which the transducer is an interdigital transducer comprising a plurality of electrodes, each electrode may be curved. The transducer may be configured to generate surface acoustic waves having a convex wavefront. Preferably, the transducer may be configured to generate surface acoustic waves having a concave wavefront. Advantageously, a concave wavefront may provide a focussing effect. In other words, a concave wavefront may focus the generated surface acoustic waves towards an atomisation region that is smaller than the transducer. Advantageously, focussing the generated surface acoustic waves may increase the rate at which energy is delivered to a liquid aerosol-forming substrate in the atomisation region.

The supply element may comprise a channel extending through the substrate between an inlet and an outlet. Preferably, the inlet is positioned on a passive surface of the substrate. Preferably, the outlet is positioned on the active surface of the substrate. Preferably, the outlet is positioned within the atomisation region.

The supply element may comprise a flow control element arranged to control a flow of a liquid aerosol-forming substrate to the atomisation region. In embodiments in which the supply element comprises a channel, preferably the flow control element is arranged to control a flow of the liquid aerosol-forming substrate into the channel.

The flow control element may comprise at least one passive element. The at least one passive element may comprise at least one of a capillary tube and a capillary wick.

The flow control element may comprise at least one active element. The at least one active element may comprise at least one of a micro pump, a syringe pump, a piston pump, and an electroosmotic pump.

In embodiments in which the aerosol-generator comprises a controller, preferably, the controller is configured to provide a flow signal to the flow control element to enable a flow of the liquid aerosol-forming substrate to the atomisation region. Preferably, the controller is configured to provide a stop signal to the control element to disable the flow of the liquid aerosol-forming substrate. Preferably, the controller is configured to provide the drive signal to the transducer only when the controller provides the flow signal to the flow control element.

The surface acoustic wave atomiser may comprise at least one reflector. Preferably, the at least one reflector is positioned on the active surface of the substrate. Preferably, the at least one reflector is arranged to reflect surface acoustic waves generated by the transducer. Preferably, the at least one reflector is arranged to reflect surface acoustic waves generated by the transducer towards the atomisation region. Advantageously, a reflector arranged to reflect surface acoustic waves towards the atomisation region may increase or maximise the efficiency of the surface acoustic wave atomiser.

The at least one reflector may comprise one or more electrodes.

The at least one reflector may comprise one or more portions of metal positioned on the active surface of the substrate. Each portion of metal may have a linear shape. Each portion of metal may have a curved shape. The at least one reflector may comprise a plurality of portions of metal. The plurality of portions of metal may be arranged in a pattern on the active surface of the substrate. Preferably, each portion of metal is substantially parallel to the adjacent portions of metal forming the at least one reflector.

A portion of the substrate may form at least part of the at least one reflector. The substrate may define at least one protrusion, wherein the at least one protrusion forms at least part of the at least one reflector. The substrate may define at least one recess, wherein the at least one recess forms at least part of the at least one reflector.

The surface acoustic wave atomiser may comprise at least one absorber. Preferably, the at least one absorber is positioned on the active surface of the substrate. Preferably, the at least one absorber is arranged to absorb surface acoustic waves generated by the transducer.

The at least one absorber may comprise a material having at least one of a low density, a low speed of sound and a high viscosity. The at least one absorber may comprise polydimethylsiloxane.

A portion of the substrate may form at least part of the at least one absorber. The substrate may define at least one protrusion, wherein the at least one protrusion forms at least part of the at least one absorber. The substrate may define at least one recess, wherein the at least one recess forms at least part of the at least one absorber.

According to a seventh aspect of the present disclosure there is provided an aerosol-generating device. The aerosol-generating device comprises an aerosol-generator according to any of the first to sixth aspects of the present disclosure, in accordance with any of the embodiments described herein. The aerosol-generating device also comprises a controller for controlling the at least one transducer, a power supply, and a liquid storage portion. The liquid storage portion is for receiving a liquid aerosol-forming substrate, wherein the supply element is arranged to supply liquid aerosol-forming substrate from the liquid storage portion to the atomisation region.

The liquid storage portion may be reusable. In other words, the liquid storage portion may be refillable by a user to replenish a liquid aerosol-forming substrate in the liquid storage portion. The liquid storage portion may comprise a refill aperture for inserting a liquid aerosol-forming substrate into the liquid storage portion. The liquid storage portion may comprise a refill valve between the refill aperture and the liquid storage portion. Advantageously, the refill valve may allow a liquid aerosol-forming substrate to flow through the refill aperture into the liquid storage portion. Advantageously, the refill valve may prevent a liquid aerosol-forming substrate from flowing out of the liquid storage portion through the refill aperture.

The liquid storage portion may be replaceable. The liquid storage portion may be removable from the aerosol-generating device. The aerosol-generating device may comprise a cartridge, wherein the cartridge is removable from the aerosol-generating device, and wherein the cartridge comprises the liquid storage portion.

The aerosol-generating device may comprise a liquid aerosol-forming substrate contained within the liquid storage portion.

The liquid aerosol-forming substrate may comprise nicotine. The nicotine containing liquid aerosol-forming substrate may be a nicotine salt matrix. The liquid aerosol-forming substrate may comprise plant-based material. The liquid aerosol-forming substrate may comprise tobacco. The liquid aerosol-forming substrate may comprise homogenised tobacco material. The liquid aerosol-forming substrate may comprise a non-tobacco-containing material. The liquid aerosol-forming substrate may comprise homogenised plant-based material.

The liquid aerosol-forming substrate may comprise at least one aerosol-former. An aerosol-former is any suitable known compound or mixture of compounds that, in use, facilitates formation of a dense and stable aerosol. Suitable aerosol-formers are well known in the art and include, but are not limited to: polyhydric alcohols, such as triethylene glycol, 1,3-butanediol and glycerine; esters of polyhydric alcohols, such as glycerol mono-, di- or triacetate; and aliphatic esters of mono-, di- or polycarboxylic acids, such as dimethyl dodecanedioate and dimethyl tetradecanedioate. Aerosol formers may be polyhydric alcohols or mixtures thereof, such as triethylene glycol, 1,3-butanediol and glycerine. The liquid aerosol-forming substrate may comprise other additives and ingredients, such as flavourants.

The liquid aerosol-forming substrate may comprise water.

The liquid aerosol-forming substrate may comprise nicotine and at least one aerosol former. The aerosol former may comprise glycerine. The aerosol-former may comprise propylene glycol. The aerosol former may comprise both glycerine and propylene glycol. The liquid aerosol-forming substrate may have a nicotine concentration of between about 0.1 percent and about 10 percent.

The controller may comprise electric circuitry connected to the power supply and each transducer. The electric circuitry may comprise a microprocessor. The microprocessor may be a programmable microprocessor, a microcontroller, or an application specific integrated chip (ASIC) or other electronic circuitry capable of providing control. The electric circuitry may comprise further electronic components. The electric circuitry may be configured to regulate a supply of power from the power supply to each transducer. The controller may be configured to supply power continuously to each transducer following activation of the aerosol-generative device. The controller may be configured to supply power intermittently to each transducer. The controller may be configured to supply power to each transducer on a puff-by-puff basis.

Preferably, the controller and the power supply are configured to provide an alternating voltage to each transducer. Preferably, the alternating voltage is a radio frequency alternating voltage. Preferably, the alternating voltage has a frequency of at least about 20 megahertz. Preferably, the alternating voltage has a frequency of between about 20 megahertz and about 100 megahertz, more preferably between about 20 megahertz and about 80 megahertz. Advantageously, an alternating voltage within these ranges may provide at least one of a desired rate of aerosol generating and a desired droplet size.

The power supply may be any suitable type of power supply. The power supply may be a DC power supply. In some preferred embodiments, the power supply is a battery, such as a rechargeable lithium ion battery. The power supply may be another form of charge storage device, such as a capacitor. The power supply may require recharging. The power supply may have a capacity that allows for the storage of enough energy for one or more uses of the device. For example, the power supply may have sufficient capacity to allow for the continuous generation of aerosol for a period of around six minutes, corresponding to the typical time taken to smoke a conventional cigarette, or for a period that is a multiple of six minutes. In another example, the power supply may have sufficient capacity to allow for a predetermined number of uses of the device or discrete activations. In one embodiment, the power supply is a DC power supply having a DC supply voltage in the range of about 2.5 Volts to about 4.5 Volts and a DC supply current in the range of about 1 Amp to about 10 Amps (corresponding to a DC power supply in the range of about 2.5 Watts to about 45 Watts).

The aerosol-generating device may advantageously comprise a DC/AC inverter, which may comprise a Class-C, Class-D or Class-E power amplifier. The DC/AC inverter may be arranged between the power supply and the at least one transducer.

The aerosol-generating device may further comprise a DC/DC converter between the power supply and the DC/AC inverter.

The aerosol-generating device may comprise a device housing. The device housing may be elongate. The device housing may comprise any suitable material or combination of materials. Examples of suitable materials include metals, alloys, plastics or composite materials containing one or more of those materials, or thermoplastics that are suitable for food or pharmaceutical applications, for example polypropylene, polyetheretherketone (PEEK) and polyethylene. Preferably, the material is light and non-brittle.

The device housing may define an air inlet. The air inlet may be configured to enable ambient air to enter the device housing. The air inlet may be in fluid communication with the atomisation region of the aerosol generator. The device may comprise any suitable number of air inlets. The device may comprise a plurality of air inlets.

The device housing may comprise an air outlet. The air outlet may be configured to enable air to exit the device housing for delivery to a user. The air outlet may be in fluid communication with the atomisation region of the aerosol generator. The aerosol-generating device may comprise a mouthpiece. The mouthpiece may comprise the air outlet. The device may comprise any suitable number of air outlets. The device may comprise a plurality of air outlets.

The invention will be further described, by way of example only, with reference to the accompanying drawings, in which.

Figure 1:
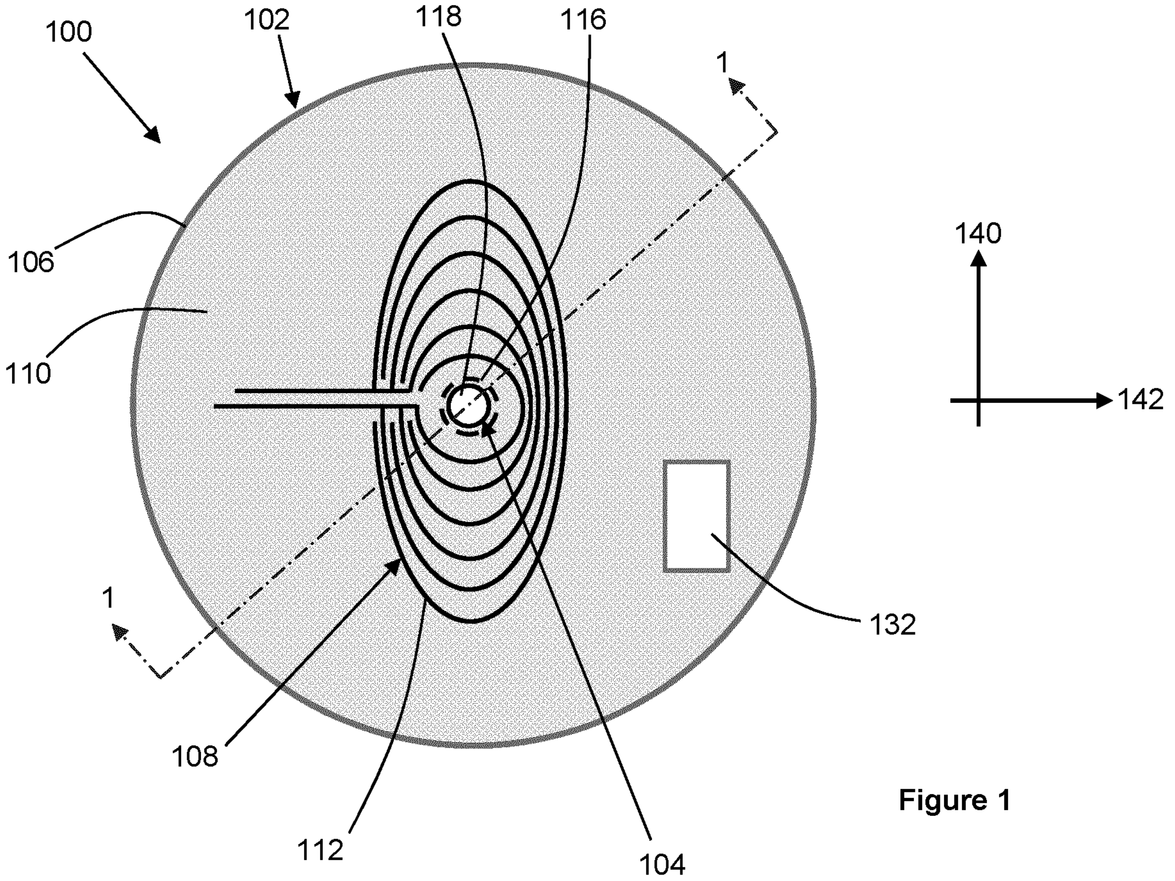
FIG. 1 shows a top view of an aerosol-generator according to a first embodiment of the present disclosure.
Figure 2:
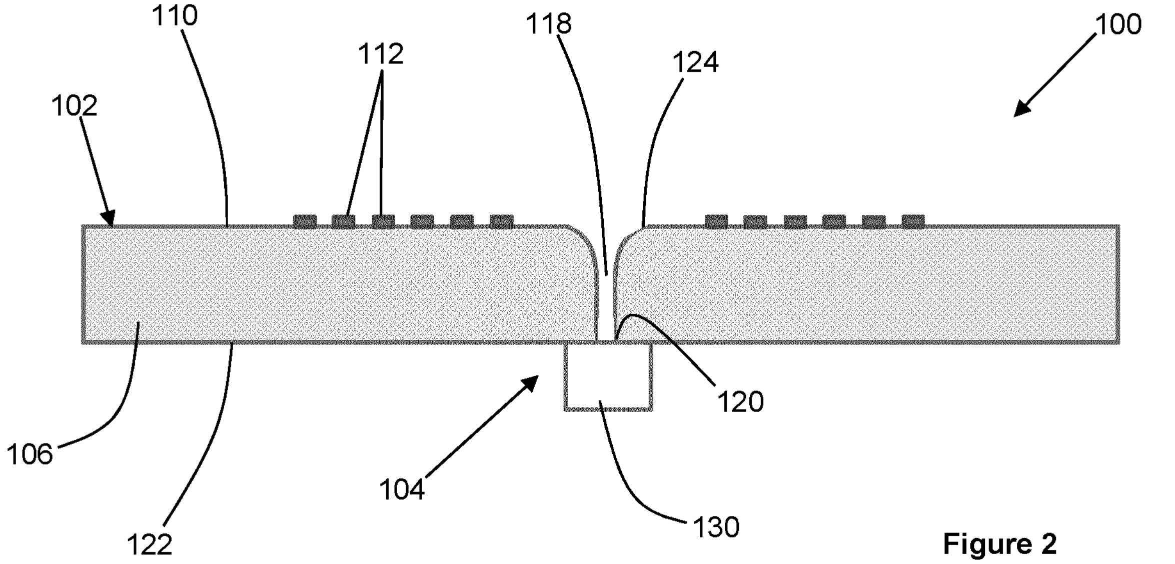
FIG. 2 shows a cross-sectional view of the aerosol-generator of FIG. 1 taken along line 1-1.

FIGS. 1 and 2 show an aerosol-generator 100 according to a first embodiment of the present disclosure. The aerosol-generator 100 comprises a surface acoustic wave atomiser 102 and a supply element 104 for supplying a liquid aerosol-forming substrate to the surface acoustic wave atomiser 102.

The surface acoustic wave atomiser 102 comprises a substrate 106 comprising a sheet of piezoelectric material, and a transducer 108 arranged on an active surface 110 of the substrate 106. The transducer 108 is an interdigital transducer comprising an array of interleaved electrodes 112. Each of the interleaved electrodes 112 has an elliptical shape and the interleaved electrodes 112 are arranged concentrically on the active surface 110 of the substrate 106. During use, the transducer 108 generates surface acoustic waves on the active surface 110 of the substrate 106. The concentric elliptical shape of the array of interleaved electrodes 112 generates surface acoustic waves having an acoustic wavefront focussed towards an atomisation region 116 on the active surface 110 of the substrate 106.

The supply element 104 comprises a channel 118 extending through the substrate 106 between an inlet 120 at a passive surface 122 of the substrate 106 and an outlet 124 at the active surface 110 of the substrate 106. The outlet 124 is positioned within the atomisation region 116. The outlet 124 has a substantially circular shape. The supply element 104 also comprises a flow control element 130 comprising a micro pump. During use, a liquid aerosol-forming substrate is supplied by the flow control element 130 through the channel 118 to the atomisation region 116 where it is atomised by surface acoustic waves generated by the transducer 108.

The aerosol-generator 100 also comprises a controller 132 arranged to control the transducer 108 and the flow control element 130. In the embodiment shown in FIG. 1 the controller 132 is positioned on the substrate 106 of the surface acoustic wave atomiser 102; however, the skilled person will appreciate that the controller 132 may be provided separately from the surface acoustic wave atomiser 102.

The controller 132 is configured to provide a drive signal to the transducer 108 for generating surface acoustic waves on the active surface 110 of the substrate 106. The controller 132 is also configured to provide flow signals and stop signals to the flow control element 130 to start and stop a flow of a liquid aerosol-forming substrate through the channel 118 and into the atomisation region 116. The controller 132 is configured to provide the drive signal to the transducer 108 only when the flow control element 130 is supplying the liquid aerosol-forming substrate to the atomisation region 116.

The transducer 108 defines a first direction 140 extending along the major axes of the elliptically shaped interleaved electrodes 112. The transducer 108 also defines a second direction 142 extending along the minor axes of the elliptically shaped interleaved electrodes 112. The elliptical shape of the interleaved electrodes 112 is such that the spacing between consecutive interleaved electrodes 112 is greater in the first direction 140 than the second direction 142.

The piezoelectric material forming the substrate 106 comprises a crystalline material, wherein the active surface 110 of the substrate 106 is defined by a lattice plane of the crystalline material. The transducer 108 is arranged on the active surface 110 of the substrate 106 so that each of the first direction and the second direction defined by the transducer 108 is aligned with a lattice vector of the lattice plane. The combination of the elliptical shape of the interleaved electrodes 112, the greater spacing between consecutive interleaved electrodes 112 in the first direction 140, and the alignment of the first and second directions 140, 142 with lattice vectors of the lattice plane defining the active surface 110 of the substrate 106 compensates for the anisotropy in the wave speed of surface acoustic waves across the active surface 110. Therefore, during use, the transducer 108 generates surface acoustic waves having a substantially circular acoustic wavefront that converges on the atomisation region 116 and the substantially circular outlet 124 of the supply element 104.

Figure 3:
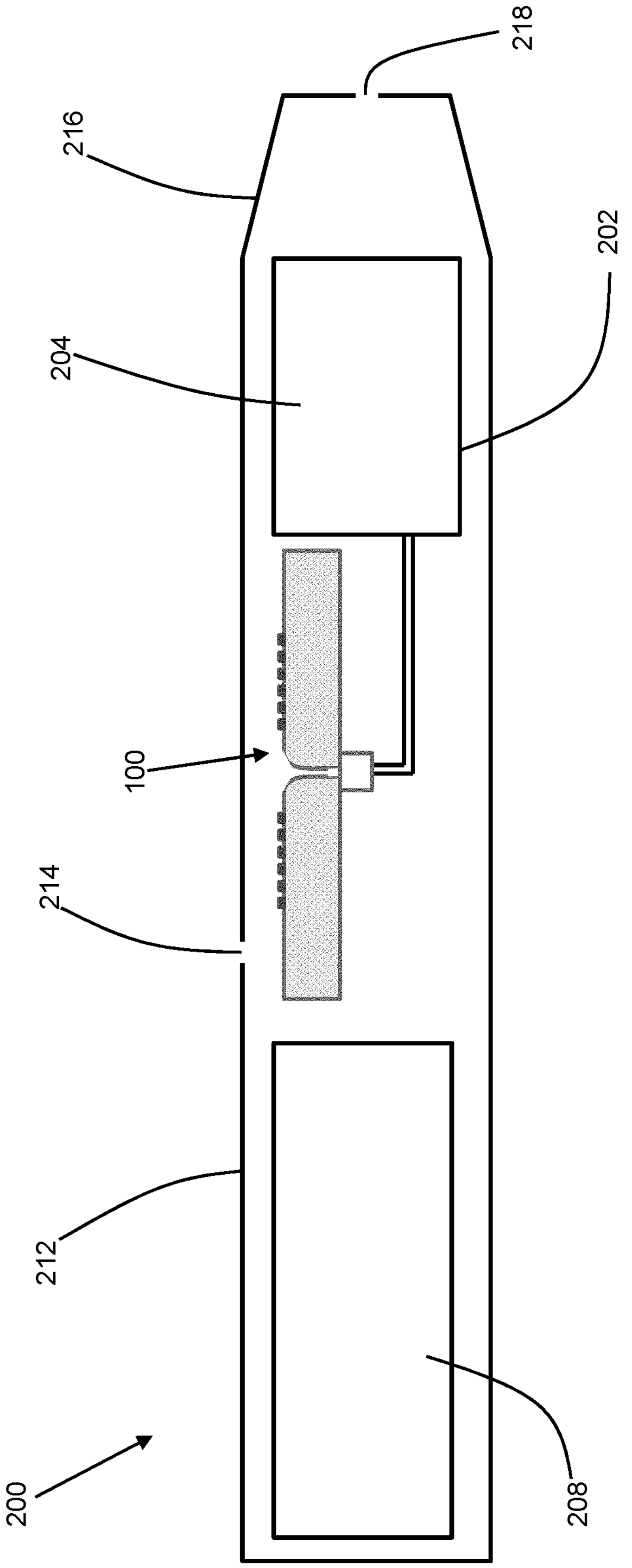
FIG. 3 shows a cross-sectional view of an aerosol-generating device comprising the aerosol-generator of FIG. 1.

FIG. 3 shows a cross-sectional view of an aerosol-generating device 200 comprising the aerosol-generator 100 of FIGS. 1 and 2. The aerosol-generating device 200 also comprises a liquid storage portion 202 containing a liquid aerosol-forming substrate 204. The flow control element 130 of the aerosol-generator 100 is arranged to supply the liquid aerosol-forming substrate 204 from the liquid storage portion 202 to the inlet 120 of the aerosol-generator 100.

The aerosol-generating device 200 also comprises a power supply 208 comprising a rechargeable battery for supplying electrical power to the controller 132, the transducer 108 and the flow control element 130.

The aerosol-generating device 200 also comprises a housing 212 in which the aerosol-generator 100, the liquid storage portion 202 and the power supply 208 are contained. The housing 212 defines an air inlet 214, a mouthpiece 216, and an air outlet 218. During use, a user draws on the mouthpiece 216 to draw air through the housing 212 from the air inlet 214 to the air outlet 218. Aerosol generated by the aerosol-generator 100 is entrained in the airflow through the housing 212 for delivery to the user.

Figure 4:
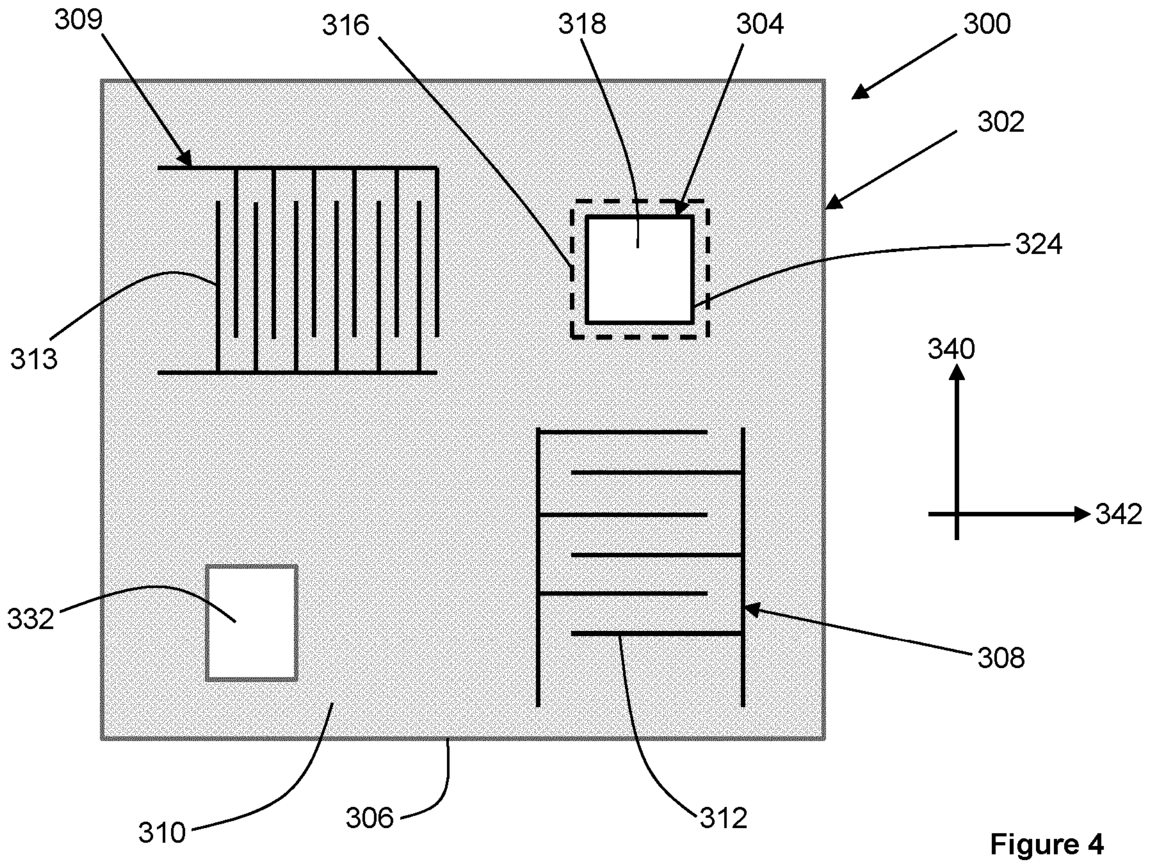
FIG. 4 shows a top view of an aerosol-generator according to a second embodiment of the present disclosure.

FIG. 4 shows an aerosol-generator 300 according to a second embodiment of the present disclosure. The aerosol-generator 300 comprises a surface acoustic wave atomiser 302 and a supply element 304 for supplying a liquid aerosol-forming substrate to the surface acoustic wave atomiser 302.

The surface acoustic wave atomiser 302 comprises a substrate 306 comprising a sheet of piezoelectric material, a first transducer 308 arranged on an active surface 310 of the substrate 306 and a second transducer 309 arranged on the active surface 310 of the substrate 306 and a second transducer 309.

The first transducer 308 is an interdigital transducer comprising a first array of interleaved electrodes 312. Each of the interleaved electrodes 312 has a linear shape and the interleaved electrodes 312 are arranged parallel to each other on the active surface 310 of the substrate 306. During use, the first transducer 308 generates substantially planar surface acoustic waves on the active surface 310 of the substrate 306 and directed towards an atomisation region 316 on the active surface 310 of the substrate 306.

The second transducer 309 is an interdigital transducer comprising a second array of interleaved electrodes 313. Each of the interleaved electrodes 313 has a linear shape and the interleaved electrodes 313 are arranged parallel to each other on the active surface 310 of the substrate 306. During use, the second transducer 309 generates substantially planar surface acoustic waves on the active surface 310 of the substrate 306 and directed towards an atomisation region 316 on the active surface 310 of the substrate 306.

The supply element 304 is similar to the supply element 104 described with reference to FIG. 1. The supply element 304 comprises a channel 318 extending through the substrate 306 between an inlet at a passive surface of the substrate 306 and an outlet 324 at the active surface 310 of the substrate 306. The outlet 324 is positioned within the atomisation region 316. The outlet 324 has a substantially square shape. The supply element 304 also comprises a flow control element comprising a micro pump. During use, a liquid aerosol-forming substrate is supplied by the flow control element through the channel 318 to the atomisation region 316 where it is atomised by surface acoustic waves generated by the first and second transducers 308, 309.

The aerosol-generator 300 also comprises a controller 332 arranged to control the first and second transducers 308, 309 and the flow control element. In the embodiment shown in FIG. 4 the controller 332 is positioned on the substrate 306 of the surface acoustic wave atomiser 302; however, the skilled person will appreciate that the controller 332 may be provided separately from the surface acoustic wave atomiser 302.

The controller 332 is configured to provide first and second drive signals to the first and second transducers 308, 309 for generating surface acoustic waves on the active surface 310 of the substrate 306. The controller 332 is also configured to provide flow signals and stop signals to the flow control element to start and stop a flow of a liquid aerosol-forming substrate through the channel 318 and into the atomisation region 316. The controller 332 is configured to provide the first and second drive signals to the first and second transducers 308, 309 only when the flow control element is supplying the liquid aerosol-forming substrate to the atomisation region 316.

The first transducer 308 is arranged on the active surface 310 of the substrate 306 to generate surface acoustic waves in a first direction 340. The second transducer 309 is arranged on the active surface 310 of the substrate 306 to generate surface acoustic waves in a second direction 342. The spacing in the first direction 340 between consecutive interleaved electrodes 312 of the first transducer 308 is greater than the spacing in the second direction 342 between consecutive interleaved electrodes 313 of the second transducer 309.

The piezoelectric material forming the substrate 306 comprises a crystalline material, wherein the active surface 310 of the substrate 306 is defined by a lattice plane of the crystalline material. The first and second transducers 308, 309 are arranged on the active surface 310 of the substrate 306 so that each of the first direction and the second direction defined by the first and second transducers 308, 309 is aligned with a lattice vector of the lattice plane. The combination of the greater spacing between consecutive interleaved electrodes 312 in the first direction 340 and the alignment of the first and second directions 340, 342 with lattice vectors of the lattice plane defining the active surface 310 of the substrate 306 compensates for the anisotropy in the wave speed of surface acoustic waves across the active surface 310. Therefore, during use, surface acoustic waves generated by the first transducer 308 may arrive at the atomisation region 316 concurrently with surface acoustic waves generated by the second transducer 309.

Figure 5:
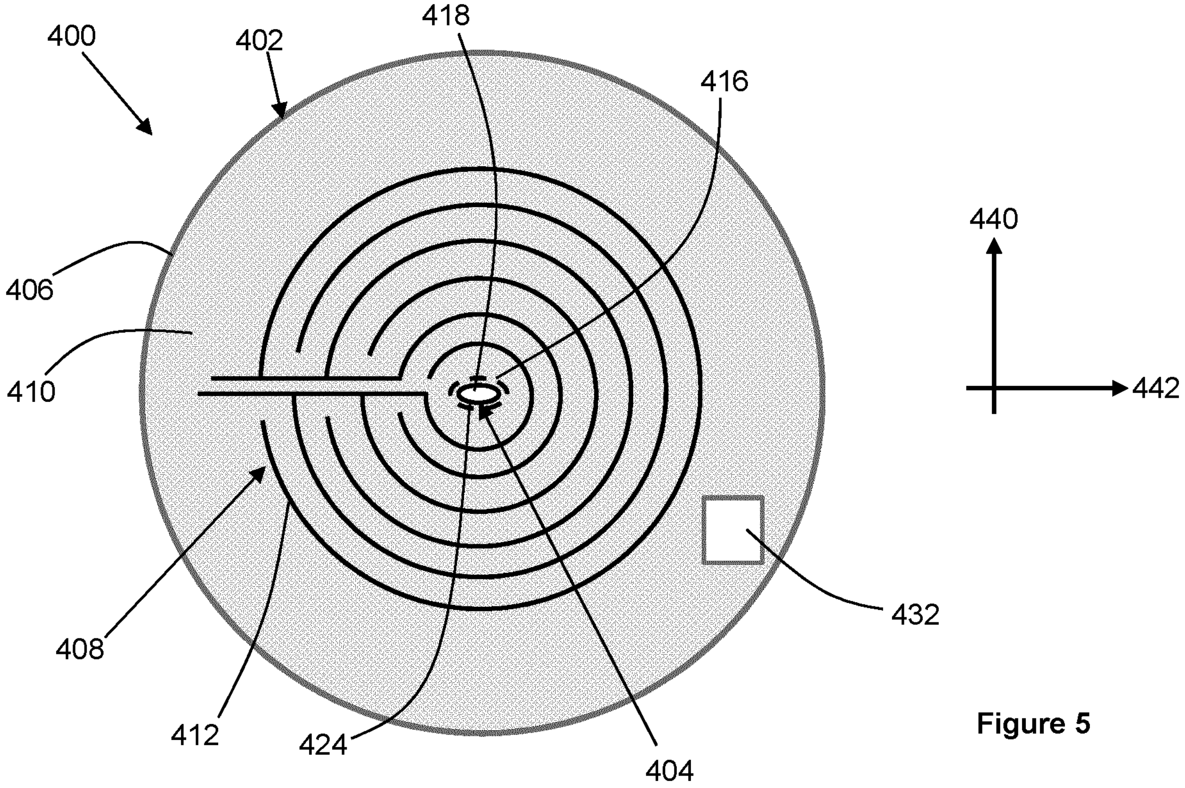
FIG. 5 shows a top view of an aerosol-generator according to a third embodiment of the present disclosure.

FIG. 5 shows an aerosol-generator 400 according to a third embodiment of the present disclosure. The aerosol-generator 400 comprises a surface acoustic wave atomiser 402 and a supply element 404 for supplying a liquid aerosol-forming substrate to the surface acoustic wave atomiser 402.

The surface acoustic wave atomiser 402 comprises a substrate 406 comprising a sheet of piezoelectric material, and a transducer 408 arranged on an active surface 410 of the substrate 406. The transducer 408 is an interdigital transducer comprising an array of interleaved electrodes 412. Each of the interleaved electrodes 412 has a substantially circular shape and the interleaved electrodes 412 are arranged concentrically on the active surface 410 of the substrate 406. During use, the transducer 408 generates surface acoustic waves on the active surface 410 of the substrate 406. The concentric circular shape of the array of interleaved electrodes 412 generates surface acoustic waves having an acoustic wavefront focussed towards an atomisation region 416 on the active surface 410 of the substrate 406.

The supply element 404 is similar to the supply element 104 described with reference to FIG. 1. The supply element 404 comprises a channel 418 extending through the substrate 406 between an inlet at a passive surface of the substrate 406 and an outlet 424 at the active surface 410 of the substrate 406. The outlet 424 is positioned within the atomisation region 416. The outlet 424 has an elliptical shape. The supply element 404 also comprises a flow control element comprising a micro pump. During use, a liquid aerosol-forming substrate is supplied by the flow control element through the channel 418 to the atomisation region 416 where it is atomised by surface acoustic waves generated by the transducer 408.

The aerosol-generator 400 also comprises a controller 432 arranged to control the transducer 408 and the flow control element. In the embodiment shown in FIG. 4 the controller 432 is positioned on the substrate 406 of the surface acoustic wave atomiser 402; however, the skilled person will appreciate that the controller 432 may be provided separately from the surface acoustic wave atomiser 402.

The controller 432 is configured to provide a drive signal to the transducer 408 for generating surface acoustic waves on the active surface 410 of the substrate 406. The controller 432 is also configured to provide flow signals and stop signals to the flow control element to start and stop a flow of a liquid aerosol-forming substrate through the channel 418 and into the atomisation region 416. The controller 432 is configured to provide the drive signal to the transducer 408 only when the flow control element is supplying the liquid aerosol-forming substrate to the atomisation region 416.

The elliptically shaped outlet 424 defines a first direction 440 extending along the minor axis of the elliptically shaped outlet 424. The elliptically shaped outlet 424 also defines a second direction 442 extending along the major axis of the elliptically shaped outlet 424.

The piezoelectric material forming the substrate 406 comprises a crystalline material, wherein the active surface 410 of the substrate 406 is defined by a lattice plane of the crystalline material. The elliptically shaped outlet 424 is arranged on the active surface 410 of the substrate 406 so that each of the first direction and the second direction defined by the elliptically shaped outlet 424 is aligned with a lattice vector of the lattice plane. Although the interleaved electrodes 412 of the transducer 408 each have a substantially circular shape, anisotropy in the wave speed of surface acoustic waves across the active surface 410 of the substrate results in surface acoustic waves generated by the transducer 408 having an elliptical acoustic wavefront. The combination of the elliptical shape of the outlet 424 and the alignment of the first and second directions 440, 442 with lattice vectors of the lattice plane defining the active surface 410 of the substrate 406 compensates for the anisotropy in the wave speed of surface acoustic waves across the active surface 410. Therefore, during use, the transducer 408 generates surface acoustic waves having an elliptical acoustic wavefront that converges on the atomisation region 416 and the elliptically shaped outlet 424 of the supply element 404.

Figure 6:
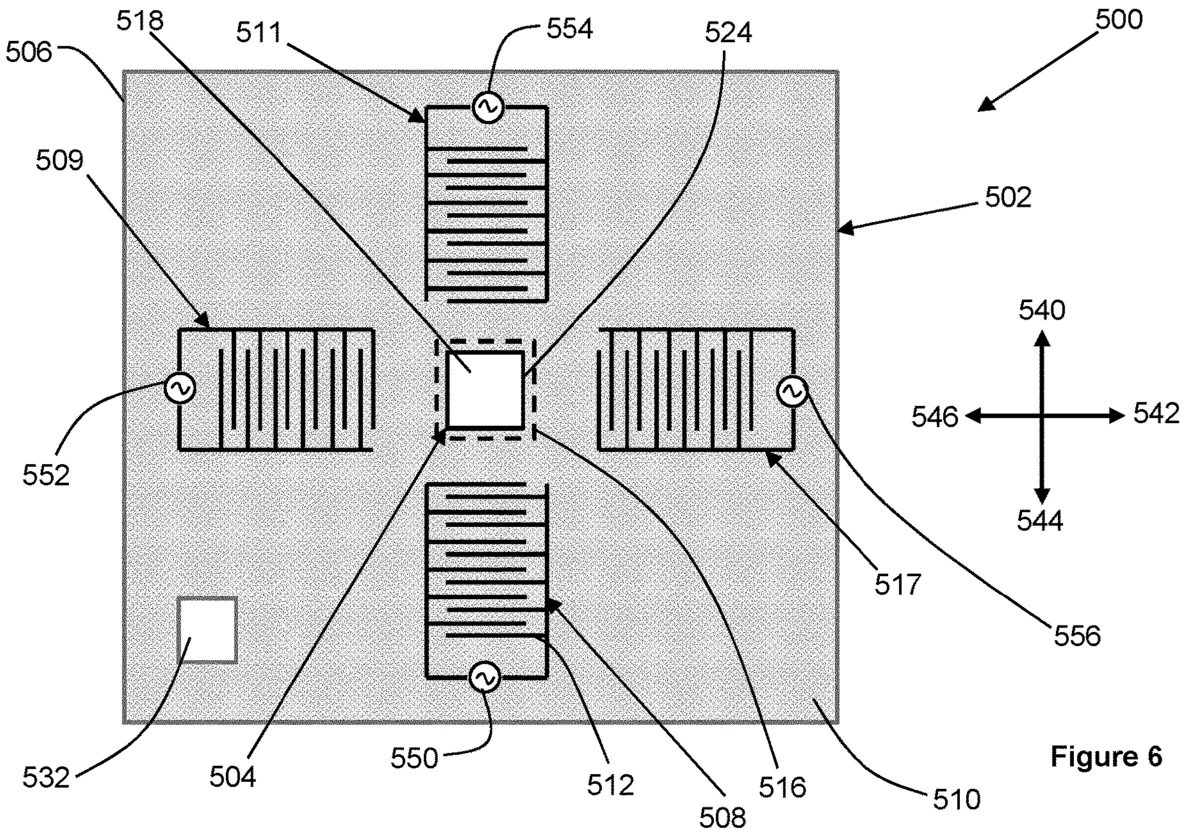
FIG. 6 shows a top view of an aerosol-generator according to a fourth embodiment of the present disclosure.

FIG. 6 shows an aerosol-generator 500 according to a fourth embodiment of the present disclosure. The aerosol-generator 500 comprises a surface acoustic wave atomiser 502 and a supply element 504 for supplying a liquid aerosol-forming substrate to the surface acoustic wave atomiser 502.

The surface acoustic wave atomiser 502 comprises a substrate 506 comprising a sheet of piezoelectric material, and a first transducer 508, a second transducer 509, a third transducer 511 and a fourth transducer 517 each arranged on an active surface 510 of the substrate 506.

Each of the first transducer 508, the second transducer 509, the third transducer 511 and the fourth transducer 517 is an interdigital transducer comprising an array of interleaved electrodes 512. Each of the interleaved electrodes 512 has a linear shape and the interleaved electrodes 512 are arranged parallel to each other on the active surface 510 of the substrate 506. During use, each of the first transducer 508, the second transducer 509, the third transducer 511 and the fourth transducer 517 generates substantially planar surface acoustic waves on the active surface 510 of the substrate 506 and directed towards an atomisation region 516 on the active surface 510 of the substrate 506.

The supply element 504 is similar to the supply element 104 described with reference to FIG. 1. The supply element 504 comprises a channel 518 extending through the substrate 506 between an inlet at a passive surface of the substrate 506 and an outlet 524 at the active surface 510 of the substrate 506. The outlet 524 is positioned within the atomisation region 516. The outlet 524 has a substantially square shape. The supply element 504 also comprises a flow control element comprising a micro pump. During use, a liquid aerosol-forming substrate is supplied by the flow control element through the channel 518 to the atomisation region 516 where it is atomised by surface acoustic waves generated by the first and second transducers 508, 509.

The aerosol-generator 500 also comprises a controller 532 arranged to control the first, second, third and fourth transducers 508, 509, 511, 517 and the flow control element. In the embodiment shown in FIG. 6 the controller 532 is positioned on the substrate 506 of the surface acoustic wave atomiser 502; however, the skilled person will appreciate that the controller 532 may be provided separately from the surface acoustic wave atomiser 502.

The controller 532 is configured to provide a first drive signal 550 to the first transducer 508 for generating surface acoustic waves in a first direction 540 on the active surface 510 of the substrate 506.

The controller 532 is configured to provide a second drive signal 552 to the second transducer 509 for generating surface acoustic waves in a second direction 542 on the active surface 510 of the substrate 506.

The controller 532 is configured to provide a third drive signal 554 to the third transducer 511 for generating surface acoustic waves in a third direction 544 on the active surface 510 of the substrate 506.

The controller 532 is configured to provide a fourth drive signal 556 to the fourth transducer 517 for generating surface acoustic waves in a fourth direction 546 on the active surface 510 of the substrate 506.

The controller 532 is also configured to provide flow signals and stop signals to the flow control element to start and stop a flow of a liquid aerosol-forming substrate through the channel 518 and into the atomisation region 516. The controller 532 is configured to provide the first, second, third and fourth drive signals 550, 552, 554, 556 to the first, second, third and fourth transducers 508, 509, 511, 517 only when the flow control element is supplying the liquid aerosol-forming substrate to the atomisation region 516.

The controller 532 is configured so that the powers of each of the first, second, third and fourth drive signals 550, 552, 554, 556 are different to each other.

The piezoelectric material forming the substrate 506 comprises a crystalline material, wherein the active surface 510 of the substrate 506 is defined by a lattice plane of the crystalline material. The first, second, third and fourth transducers 508, 509, 511, 517 are arranged on the active surface 510 of the substrate 506 so that each of the first, second, third and fourth directions 540, 542, 544, 546 is aligned with a lattice vector of the lattice plane. The combination of the different powers of the first, second, third and fourth drive signals 550, 552, 554, 556 and the alignment of the first and second directions 540, 542 with lattice vectors of the lattice plane defining the active surface 510 of the substrate 506 compensates for the anisotropy in the electromechanical coupling coefficient across the active surface 510. Therefore, during use, surface acoustic waves generated by each of the first, second, third and fourth transducers 508, 509, 511, 517 have the same amplitude.

Figure 7:
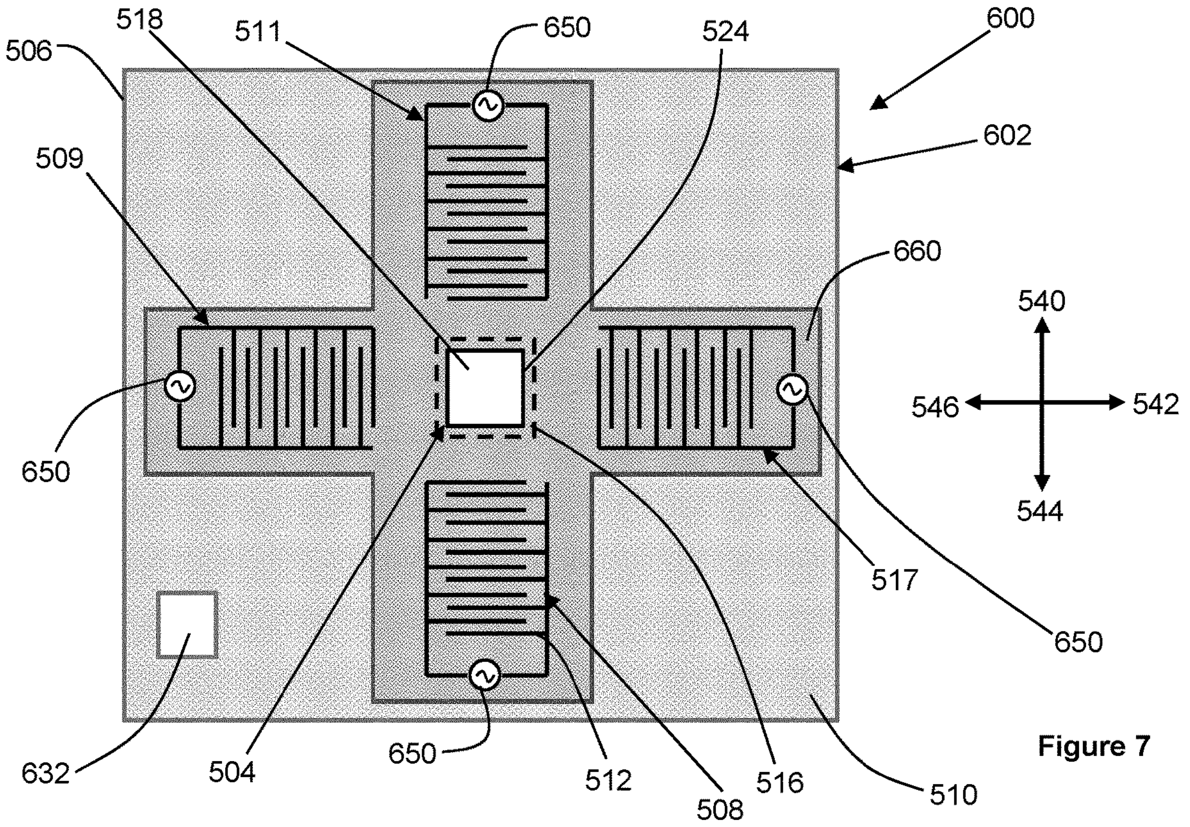
FIG. 7 shows a top view of an aerosol-generator according to a fifth embodiment of the present disclosure.

FIG. 7 shows an aerosol-generator 600 according to a fifth embodiment of the present disclosure. The aerosol-generator 600 comprises a surface acoustic wave atomiser 602 and a supply element 504.

The supply element 504 of the aerosol-generator 600 is identical to the supply element 504 described with reference to FIG. 6 and like reference numerals are used to designate like parts.

The surface acoustic wave atomiser 602 is similar to the surface acoustic wave atomiser 502 described with reference to FIG. 6 and like reference numerals are used to designate like parts. The surface acoustic wave atomiser 602 differs from the surface acoustic wave atomiser 502 by the addition of a surface treatment 660 of a portion of the active surface 510 of the substrate 506 underlying the first, second, third and fourth transducers 508, 509, 511, 517. The surface treatment 660 comprises a proton exchange treatment and provides the active surface 510 of the substrate 506 with a substantially isotropic electromechanical coupling coefficient in the area to which the surface treatment 660 is applied. Therefore, the controller 632 is configured to provide a common drive signal 650 to each of the first, second, third and fourth transducers 508, 509, 511, 517.

The invention claimed is:

1. An aerosol-generator for an aerosol-generating device, the aerosol-generator comprising:

a surface acoustic wave atomiser comprising:

a substrate comprising an active surface defining an atomisation region, and at least one transducer positioned on the active surface of the substrate to generate surface acoustic waves for defining an acoustic wavefront on the active surface of the substrate; and a supply element arranged to supply a liquid aerosol-forming substrate to the atomisation region so that liquid aerosol-forming substrate in the atomisation region defines an interface between the active surface, the liquid aerosol-forming substrate, and the atmosphere, wherein the at least one transducer and the supply element are configured so that a shape of the acoustic wavefront at the interface corresponds to a shape of at least part of the interface, wherein the at least one transducer comprises an interdigital transducer comprising an array of interleaved electrodes, wherein a spacing between consecutive interleaved electrodes varies with direction across the active surface, wherein each of the interleaved electrodes has an elliptical shape, and wherein the interleaved electrodes are arranged concentrically on the active surface.

2. The aerosol-generator according to claim 1, wherein the atomisation region is positioned at a centre of the array of concentric interleaved electrodes.

3. The aerosol-generator according to claim 1, wherein the interdigital transducer defines a first direction extending along the major axes of the concentric interleaved electrodes and a second direction extending along the minor axes of the concentric interleaved electrodes, and wherein the spacing between the consecutive interleaved electrodes is greater in the first direction than the second direction.

4. The aerosol-generator according to claim 1, wherein the array of interleaved electrodes has a symmetrical shape comprising a first line of symmetry extending in a first direction and a second line of symmetry extending in a second direction, and wherein the first direction is orthogonal to the second direction.

5. An aerosol-generator for an aerosol-generating device, the aerosol-generator comprising:

a surface acoustic wave atomiser comprising:

a substrate comprising an active surface defining an atomisation region, a first transducer positioned on the active surface of the substrate to generate surface acoustic waves in a first direction along the active surface towards the atomisation region, and a second transducer positioned on the active surface of the substrate to generate surface acoustic waves in a second direction along the active surface towards the atomisation region, wherein the first direction is different from the second direction;

a supply element arranged to supply a liquid aerosol-forming substrate to the atomisation region; and a controller configured to provide a first drive signal to the first transducer and a second drive signal to the second transducer, wherein the first drive signal is different from the second drive signal.

6. The aerosol-generator according to claim 5, wherein a power of the first drive signal is different from a power of the second drive signal.

7. The aerosol-generator according to claim 6, wherein the substrate has a first electromechanical coupling coefficient in the first direction and a second electromechanical coupling coefficient in the second direction, wherein the first electromechanical coupling coefficient is larger than the second electromechanical coupling coefficient, and wherein the power of the first drive signal is smaller than the power of the second drive signal.

8. The aerosol-generator according to claim 7, wherein a ratio of the first electromechanical coupling coefficient to the second electromechanical coupling coefficient is the same as a ratio of the power of the second drive signal to the power of the first drive signal.

9. The aerosol-generator according to claim 5, wherein the first direction is orthogonal to the second direction.

10. The aerosol-generator according to claim 3, wherein the substrate comprises a crystalline material, wherein the active surface is defined by a lattice plane of the crystalline material, and wherein each of the first direction and the second direction is aligned with a lattice vector of the lattice plane.

11. An aerosol-generating device, comprising:

an aerosol-generator according to claim 1;

a controller configured to control the at least one transducer;

a power supply; and a liquid storage portion configured to receive a liquid aerosol-forming substrate, wherein the supply element is arranged to supply the liquid aerosol-forming substrate from the liquid storage portion to the atomisation region.

12. An aerosol-generator for an aerosol-generating device, the aerosol-generator comprising:

a surface acoustic wave atomiser comprising:

a substrate comprising an active surface defining an atomisation region, and at least one transducer positioned on the active surface of the substrate to generate surface acoustic waves for defining an acoustic wavefront on the active surface of the substrate; and a supply element arranged to supply a liquid aerosol-forming substrate to the atomisation region so that liquid aerosol-forming substrate in the atomisation region defines an interface between the active surface, the liquid aerosol-forming substrate, and the atmosphere, wherein the at least one transducer and the supply element are configured so that a shape of the acoustic wavefront at the interface corresponds to a shape of at least part of the interface;

wherein the at least one transducer comprises a first interdigital transducer comprising a first array of interleaved electrodes and a second interdigital transducer comprising a second array of interleaved electrodes, and wherein a spacing between consecutive electrodes of the first array of interleaved electrodes is different from a spacing between consecutive electrodes of the second array of interleaved electrodes.

13. The aerosol-generator according to claim 12, wherein the first interdigital transducer is configured to generate surface acoustic waves in a first direction along the active surface towards the atomisation region, wherein the second interdigital transducer is configured to generate surface acoustic waves in a second direction along the active surface towards the atomisation region, and wherein the first direction is different from the second direction.

14. The aerosol-generator according to claim 13, wherein each of the first interdigital transducer and the second interdigital transducer is further configured to generate plane surface acoustic waves.

15. The aerosol-generator according to claim 13, wherein the first direction is orthogonal to the second direction.

16. An aerosol-generating device, comprising:

an aerosol-generator according to claim 5;

a power supply; and a liquid storage portion configured to receive a liquid aerosol-forming substrate, wherein the supply element is arranged to supply the liquid aerosol-forming substrate from the liquid storage portion to the atomisation region, and wherein the controller is further configured to control the first and the second transducers.

17. An aerosol-generating device, comprising:

an aerosol-generator according to claim 12;

a controller configured to control the at least one transducer;

a power supply; and a liquid storage portion configured to receive a liquid aerosol-forming substrate, wherein the supply element is arranged to supply the liquid aerosol-forming substrate from the liquid storage portion to the atomisation region.

* * * * *